United States Patent
Sato et al.

(10) Patent No.: US 11,981,198 B2
(45) Date of Patent: May 14, 2024

(54) MOVER, CARRIER, PARTS MOUNTING SYSTEM, AND SHAFT COUPLING FOR MOVERS

(71) Applicant: Panasonic Intellectual Property Management Co., Ltd., Osaka (JP)

(72) Inventors: Hiroyuki Sato, Osaka (JP); Yumiko Oshima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 366 days.

(21) Appl. No.: 17/455,931

(22) Filed: Nov. 22, 2021

(65) Prior Publication Data
US 2022/0169113 A1 Jun. 2, 2022

(30) Foreign Application Priority Data
Nov. 27, 2020 (JP) .................. 2020-197494

(51) Int. Cl.
*B60K 1/02* (2006.01)
*B60K 17/30* (2006.01)
*B60L 15/00* (2006.01)

(52) U.S. Cl.
CPC .............. *B60K 17/30* (2013.01); *B60K 1/02* (2013.01); *B60L 15/005* (2013.01)

(58) Field of Classification Search
CPC .......... B60K 17/30; B60K 1/02; B60K 17/06; B60L 15/005; B60L 2200/04; B62D 5/0418
See application file for complete search history.

(56) References Cited

U.S. PATENT DOCUMENTS

| | | | | |
|---|---|---|---|---|
| 5,199,524 A * | 4/1993 | Ivancic | ............... | B60K 17/358 180/242 |
| 5,988,306 A * | 11/1999 | Ooishi | ................ | G05D 1/0263 180/24.02 |
| 6,298,294 B1 * | 10/2001 | Murata | ............... | B60G 17/018 280/5.515 |
| 9,275,690 B2 * | 3/2016 | Schiller | .................. | G11C 5/141 |
| 9,359,005 B2 * | 6/2016 | Doan | ................... | B62D 5/0418 |

(Continued)

FOREIGN PATENT DOCUMENTS

JP 2002-039786 A 2/2002

*Primary Examiner* — Jason D Shanske
*Assistant Examiner* — James J Triggs
(74) *Attorney, Agent, or Firm* — PEARNE & GORDON LLP

(57) ABSTRACT

A mover includes a body, an axle, a drive wheel, a motor, a speed reducer, and a shaft coupling. The wheel is arranged rotatably around the axle. The reducer is attached to the axle to reduce and transmit rotational power of the motor and includes an output shaft aligned with a center axis of the axle. The coupling transmits the rotational power of the reducer to the wheel and includes a cylindrical portion having an annular shape when viewed along the center axis and housing the reducer at least partially inside. The cylindrical portion includes an input portion and an output portion at first and second ends, respectively, along the center axis. The cylindrical portion further includes an absorber between the input and output portions to absorb deviation and an angle of deviation between respective rotational center axes of the output shaft and the drive wheel.

18 Claims, 9 Drawing Sheets

(56) References Cited

U.S. PATENT DOCUMENTS

| | | | |
|---|---|---|---|
| 10,589,940 B2* | 3/2020 | Yang | G05D 1/0231 |
| 10,921,819 B2* | 2/2021 | Brucker | G05D 1/0263 |
| 2003/0127260 A1* | 7/2003 | Angeles | B60L 15/2054 |
| | | | 180/24.07 |
| 2004/0042885 A1* | 3/2004 | Rokkaku | B60L 15/38 |
| | | | 414/529 |
| 2013/0226405 A1* | 8/2013 | Koumura | B60G 17/0165 |
| | | | 701/38 |
| 2016/0231751 A1* | 8/2016 | Mecklinger | G05D 1/024 |
| 2018/0072212 A1* | 3/2018 | Alfaro | B62D 63/025 |
| 2021/0339993 A1* | 11/2021 | Matsuda | B66F 9/0755 |
| 2022/0169113 A1* | 6/2022 | Sato | B60K 7/0007 |

\* cited by examiner

MOVER, CARRIER, PARTS MOUNTING SYSTEM, AND SHAFT COUPLING FOR MOVERS

CROSS-REFERENCE TO RELATED APPLICATIONS

The present application is based upon, and claims the benefit of priority to, Japanese Patent Application No. 2020-197494, filed on Nov. 27, 2020, the entire contents of which are hereby incorporated by reference.

TECHNICAL FIELD

The present disclosure relates to a mover, a carrier, a parts mounting system, and a shaft coupling for movers. More particularly, the present disclosure relates to a mover configured to travel on a traveling surface, a carrier, a parts mounting system, and a shaft coupling for movers.

BACKGROUND ART

JP 2002-39786 A discloses an unmanned carrier vehicle (carrier). This unmanned carrier vehicle includes two steered wheels (drive wheels) to turn as a traveling motor is driven. This unmanned vehicle moves in a desired moving direction by having the two steered wheels turned by a steering motor.

JP 2002-39786 A teaches using, as the traveling motor, a wheel-in-motor held in each of the steered wheels but fails to teach exactly how to transmit the rotational power of each wheel-in-motor to its associated steered wheel.

When the rotational power of such a motor or a speed reducer is transmitted to the drive wheel, the deviation or the angle of deviation between the rotational center axis of the output shaft of either the motor or the speed reducer and the rotational center axis of the drive wheel poses a problem. Thus, to overcome this problem, a coupling with an absorber that may absorb the deviation and the angle of deviation is generally used.

Nevertheless, the known coupling couples the output shaft and the drive wheel together such that the respective rotational center axes of the output shaft and the drive wheel are aligned with each other on the same axis, which causes a significant increase in the respective axial lengths of the motor or the speed reducer and the drive wheel.

SUMMARY

The present disclosure provides a mover, a carrier, a parts mounting system, and a shaft coupling for movers, all of which are configured to reduce the chances of the speed reducer and the drive wheel having too long axial lengths.

A mover according to an aspect of the present disclosure includes a body, an axle, a drive wheel, a motor, a speed reducer, and a shaft coupling. The axle is provided for the body. The drive wheel is arranged rotatably around the axle. The speed reducer is attached to the axle and reduces rotational power of the motor and transmits reduced rotational power of the motor. The speed reducer includes an output shaft aligned with a center axis of the axle. The shaft coupling transmits the rotational power of the speed reducer to the drive wheel. The shaft coupling includes a cylindrical portion. The cylindrical portion has an annular shape when viewed along the center axis and houses the speed reducer at least partially inside. The cylindrical portion includes an input portion forming one part, located at a first end along the center axis, of the cylindrical portion. The input portion receives the rotational power from the output shaft. The cylindrical portion also includes an output portion forming another part, located at a second end along the center axis, of the cylindrical portion. The output portion outputs the rotational power to the drive wheel. The cylindrical portion further includes an absorber provided between the input portion and the output portion. The absorber absorbs deviation and an angle of deviation between a rotational center axis of the output shaft and a rotational center axis of the drive wheel.

A mover according to another aspect of the present disclosure includes a body, an axle, a drive wheel, a motor, and a shaft coupling. The axle is provided for the body. The drive wheel is arranged rotatably around the axle. The motor is attached to the axle. The motor includes an output shaft aligned with a center axis of the axle. The shaft coupling transmits rotational power of the motor to the drive wheel. The shaft coupling includes a cylindrical portion. The cylindrical portion has an annular shape when viewed along the center axis and houses the motor at least partially inside. The cylindrical portion includes an input portion forming one part, located at a first end along the center axis, of the cylindrical portion. The input portion receives the rotational power from the output shaft. The cylindrical portion also includes an output portion forming another part, located at a second end along the center axis, of the cylindrical portion. The output portion outputs the rotational power to the drive wheel. The cylindrical portion further includes an absorber provided between the input portion and the output portion. The absorber absorbs deviation and an angle of deviation between a rotational center axis of the output shaft and a rotational center axis of the drive wheel.

A carrier according to still another aspect of the present disclosure uses the mover described above. The body includes a holder to hold a burden thereon.

A parts mounting system according to yet another aspect of the present disclosure includes at least one parts mounter to mount parts on a board. The parts mounter includes: a feeder cart to feed the parts; and a mounter body including a mount head to mount the parts onto the board. The feeder cart is the burden to be carried by the carrier to the mounter body.

A shaft coupling for movers according to yet another aspect of the present disclosure includes a cylindrical portion. The cylindrical portion has an annular shape when viewed along an axis and houses a speed reducer and/or a motor at least partially inside. The cylindrical portion includes an input portion forming one part, located at a first end along the axis, of the cylindrical portion. The input portion receives rotational power from an output shaft of the speed reducer or an output shaft of the motor. The cylindrical portion also includes an output portion forming another part, located at a second end along the axis, of the cylindrical portion. The output portion outputs the rotational power to a drive wheel. The cylindrical portion further includes an absorber provided between the input portion and the output portion. The absorber absorbs deviation and an angle of deviation between a center axis of the input portion and a center axis of the output portion.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION (1) Overview

Figure 1:
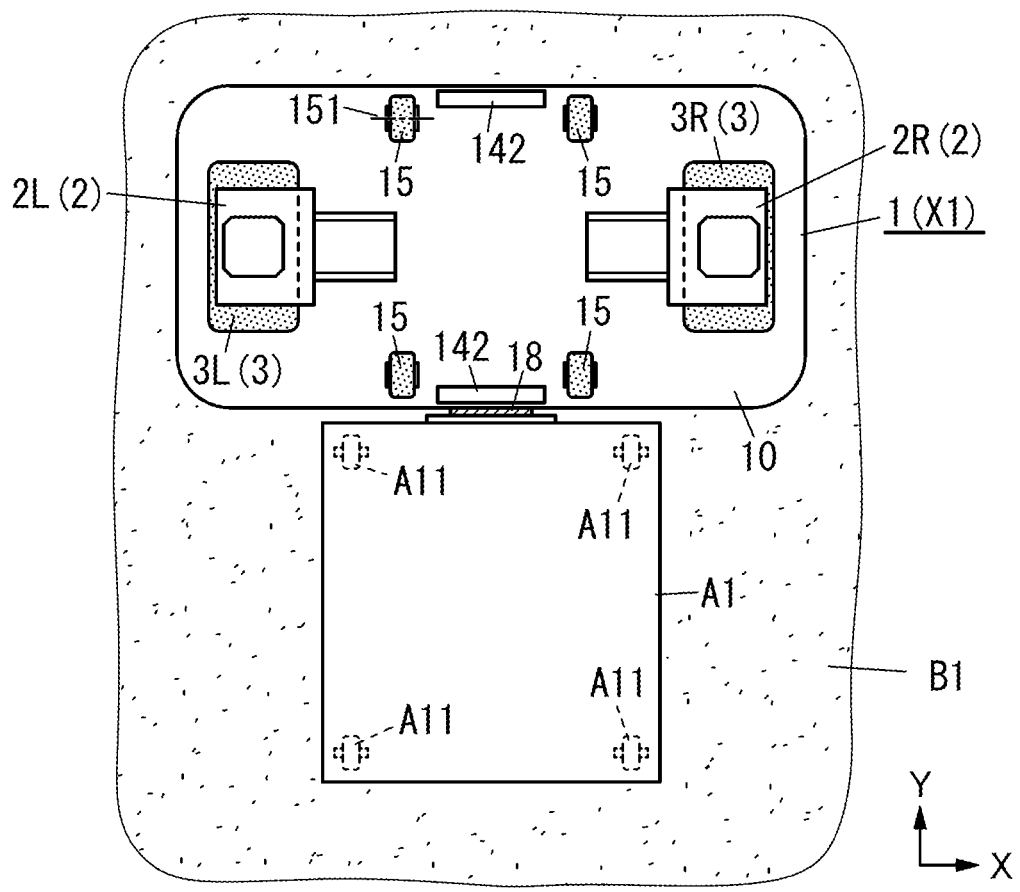
FIG. 1 is a schematic plan view illustrating a state where a carrier that uses a mover according to a first embodiment of the present disclosure is carrying a burden.

The drawings to be referred to in the following description of embodiments are all schematic representations. Thus, the ratio of the dimensions (including thicknesses) of respective constituent elements illustrated on the drawings does not always reflect their actual dimensional ratio.

A mover 1 includes a body 10, an axle 21, a drive wheel 3, a motor 4 (drive motors 4L, 4R), a speed reducer 5, and a shaft coupling 6. The drive wheel 3 is arranged rotatably around the axle 21. The speed reducer 5 is attached to the axle 21 to reduce the rotational power of the motor 4 and transmit the reduced rotational power of the motor 4. The speed reducer 5 includes an output shaft 51 aligned with a center axis 210 of the axle 21. The shaft coupling 6 transmits the rotational power of the speed reducer 5 to the drive wheel 3. The shaft coupling 6 includes a cylindrical portion 61. The cylindrical portion 61 has an annular shape when viewed along the center axis 210 and houses the speed reducer 5 at least partially inside. The cylindrical portion 61 includes an input portion 611 forming one part, located at a first end along the center axis 210, of the cylindrical portion 61. The input portion 611 receives the rotational power from the output shaft 51. The cylindrical portion 61 also includes an output portion 612 forming another part, located at a second end along the center axis 210, of the cylindrical portion 61. The output portion 612 outputs the rotational power to the drive wheel 3. The cylindrical portion 61 further includes an absorber 610 provided between the input portion 611 and the output portion 612. The absorber 610 absorbs deviation and an angle of deviation between a rotational center axis 510 of the output shaft 51 and a rotational center axis 300 of the drive wheel 3.

Providing the shaft coupling 6 including such a cylindrical portion 61 allows the mover 1 to absorb the deviation and the angle of deviation between the rotational center axis 510 of the output shaft 51 and the rotational center axis 300 of the drive wheel 3. In addition, housing a part of the speed reducer 5 inside the cylindrical portion 61 reduces the chances of the speed reducer 5 and the drive wheel 3 having excessive lengths along the center axis 210, thus contributing to reducing the size of a drive wheel unit 2 and eventually the overall size of the mover 1 as well.

In the following description, embodiments of the present disclosure will be described on the supposition that the mover 1 according to each of the embodiments is a carrier X1 for carrying a burden A1 as shown in FIG. 1. The burden A1 includes wheels A11 and is configured to travel, along with the carrier X1, on a traveling surface B1 on the wheels A11.

The carrier X1 may be introduced into various types of facilities, examples of which include factories, distribution centers (including shipping centers), offices, stores, schools, and hospitals. The traveling surface B1 is surface on which the carrier X1 moves. When the carrier X1 moves inside a facility, the traveling surface B1 may be the floor surface of the facility, for example. On the other hand, when the carrier X1 moves outdoors, the traveling surface B1 may be the ground, for example. In the following description, a situation where the carrier X1 is used in a factory where a parts mounting system W1 (see FIG. 3) is installed will be described as an example. The parts mounting system W1 will be described in the "(2.3) Parts mounting system" section.

(2) First Embodiment

Figure 2:
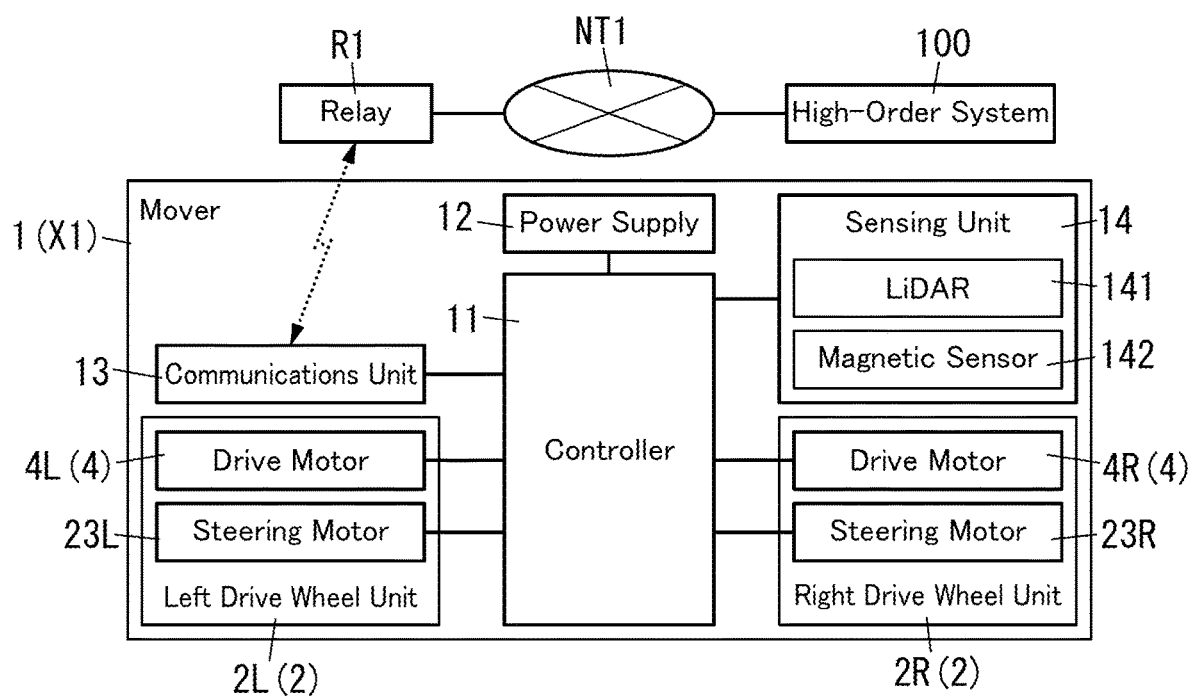
FIG. 2 is a schematic block diagram of an overall system including the carrier.

A carrier X1 that uses a mover 1 according to a first embodiment and a parts mounting system W1 (see FIG. 3) including the carrier X1 will be described in detail with reference to FIGS. 1-3.

(2.1) Overall Configuration

The carrier X1 according to this embodiment is configured to be ready to communicate with a high-order system 100 (see FIG. 2), for example. As used herein, "to be ready to communicate" means being able to transmit and receive information either directly or indirectly via a network NT1 or a relay R1, for example, by an appropriate communications method that is either wired communication or wireless communication. In this embodiment, the high-order system 100 and the carrier X1 are ready to communicate with each other bidirectionally. That is to say, information may be transmitted from the high-order system 100 to the carrier X1 and from the carrier X1 to the high-order system 100.

The high-order system 100 is a system for controlling either a single carrier X1 or a plurality of carriers X1 comprehensively, and may be implemented as a server device, for example. The high-order system 100 controls the plurality of carriers X1 indirectly by sending an instruction to each of the plurality of carriers X1. Specifically, when the high-order system 100 gives a carrier X1 an instruction to carry a burden A1, the carrier X1 autonomously performs the job of carrying the burden A1 to a target location in accordance with the carry instruction.

In this embodiment, the high-order system 100 is implemented as a computer system including, as major constituent elements, one or more processors and a memory. Thus, the functions of the high-order system 100 are performed by making the one or more processors execute a program stored in the memory. The program may be stored in advance in the memory. Alternatively, the program may also be downloaded via a telecommunications line such as the Internet or distributed after having been stored in a non-transitory storage medium such as a memory card. Note that in this embodiment, the high-order system 100 is not an essential constituent element but may be omitted as appropriate. In the latter case, the carrier X1 may autonomously perform the job of carrying the burden A1 in accordance with a carry instruction that has been entered either directly or indirectly through an operating terminal.

(2.2) Mover

Next, a mover 1 for use as the carrier X1 will be described.

The mover 1 is an unmanned carrier vehicle to carry the burden A1 as shown in FIG. 1. The mover 1 includes a body 10, at least one drive wheel 3, and a plurality of auxiliary wheels 15. The mover 1 according to this embodiment includes a pair of drive wheels 3 and two pairs of auxiliary wheels 15. In addition, the mover 1 according to this embodiment further includes drive wheel units 2 for driving the drive wheels 3, a controller 11, a power supply 12, a communications unit 13, and a sensing unit 14 as shown in FIG. 2.

The mover 1 includes a plurality of (e.g., two in this embodiment) drive wheels 3 which are arranged side by side in the rightward/leftward direction defined with respect to the mover 1. As used herein, the "rightward/leftward direction" corresponds to the longitudinal axis of the mover 1 and the X-axis direction shown in FIG. 1. On the other hand, a "forward/backward direction" defined with respect to the mover 1 is a direction perpendicular to both the rightward/leftward direction and an upward/downward direction (which is defined by a normal to the traveling surface B1), i.e., corresponds to the latitudinal axis of the mover 1 and the Y-axis direction shown in FIG. 1.

The mover 1 according to this embodiment may be used as a carrier X1. In the carrier X1 that uses the mover 1, the body 10 includes a holder 18 (see FIG. 1) for holding the burden A1 thereon. In this embodiment, the holder 18 includes a burden coupling portion 181 to be coupled to the burden A1 to hold the burden A1 thereon.

One surface, facing one of the forward/backward directions, of the mover 1 is provided with a burden coupling portion 181, to which the burden A1 is coupled when the mover 1 is going to carry the burden A1. The mover 1 moves along with the burden A1 coupled to the mover 1 via the burden coupling portion 181. The burden coupling portion 181 is removably coupled to the burden A1 by gripping (e.g., by hooking or fitting) at least a part of the burden A1 traveling on the traveling surface B1. The burden coupling portion 181 removably couples the burden A1 to the body 10 with a degree of freedom left in the upward/downward direction, for example. In this case, the burden A1 may be coupled to the burden coupling portion 181 either automatically by the mover 1 itself or any other device or manually by a human. Optionally, the shape of the burden coupling portion 181 and the number of the burden coupling portion(s) 181 provided for the mover 1 (carrier X1) may be changed as appropriate. In this embodiment, the mover 1 includes the burden coupling portion 181 as an exemplary holder 18 for holding the burden A1 thereon. However, the holder does not have to be the burden coupling portion 181. Alternatively, the mover 1 may include, for example, an electromagnet as a holder to hold the burden A1 thereon by attracting the burden A1 with the magnetic force generated by the electromagnet.

In the following description, when the mover 1 moves in the forward/backward direction, the direction in which the mover 1 is going to travel (i.e., the traveling direction and the positive Y-axis direction) will be hereinafter referred to as a "forward direction" and the opposite direction will be hereinafter referred to as a "backward direction." The mover 1 may carry the burden A1 either by towing the burden A1 with the mover 1 traveling ahead of the burden A1 or by pushing the burden A1 with the burden A1 traveling ahead of the mover 1. Generally speaking, the mover 1 may travel with more stability when towing the burden A1 rather than when pushing the burden A1 from behind the burden A1. Thus, the mover 1 normally moves while towing the burden A1. When the mover 1 moves while towing the burden A1, the positive Y-axis direction is the forward direction and the positive X-axis direction is the rightward direction. However, these directions are only examples and should not be construed as limiting the directions in which the mover 1 is used. In addition, the arrows indicating the respective directions on the drawings are just shown there as an assistant to description and are insubstantial ones.

Figure 3:
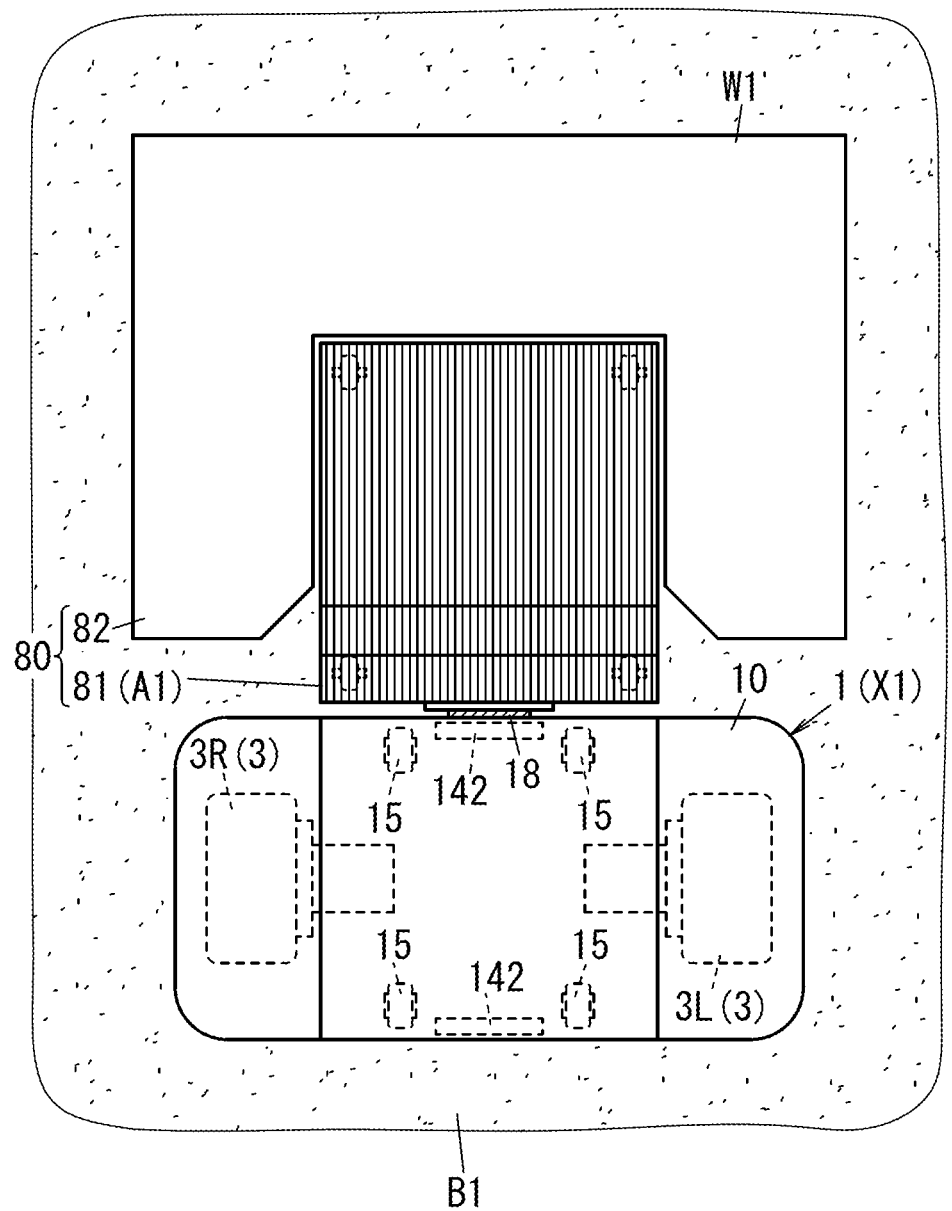
FIG. 3 is a plan view schematically illustrating the carrier and a parts mounting system.

The body 10 of the mover 1 is formed in a generally rectangular parallelepiped shape as shown in FIGS. 1 and 3. On a lower part of the body 10, arranged are a plurality of drive wheels 3 and a plurality of auxiliary wheels 15. In this embodiment, a pair of drive wheels 3 are arranged side by side in the rightward/leftward direction with respect to the body 10. In addition, on the body 10, a pair of auxiliary wheels 15 are arranged side by side in the rightward/leftward direction in front of the pair of drive wheels 3 and another pair of auxiliary wheels 15 are arranged side by side in the rightward/leftward direction behind the pair of drive wheels 3.

In this embodiment, the pair of drive wheels 3 includes a left drive wheel 3L located on the left side of the body 10 and a right drive wheel 3R located on the right side of the body 10. In this embodiment, the body 10 is provided with these two drive wheels 3 and the mover 1 travels on the traveling surface B1 on the two drive wheels 3 and the four auxiliary wheels 15.

In this embodiment, each of the left drive wheel 3L and the right drive wheel 3R serves as a steered wheel as well. A driving mechanism for driving the left drive wheel 3L and a steering mechanism for changing the orientation of the left drive wheel 3L are integrated together as a left drive wheel unit 2L. In addition, a driving mechanism for driving the right drive wheel 3R and a steering mechanism for changing the orientation of the right drive wheel 3R are integrated together as a right drive wheel unit 2R. That is to say, the drive wheel unit 2 includes the left drive wheel unit 2L and the right drive wheel unit 2R.

Figure 4:
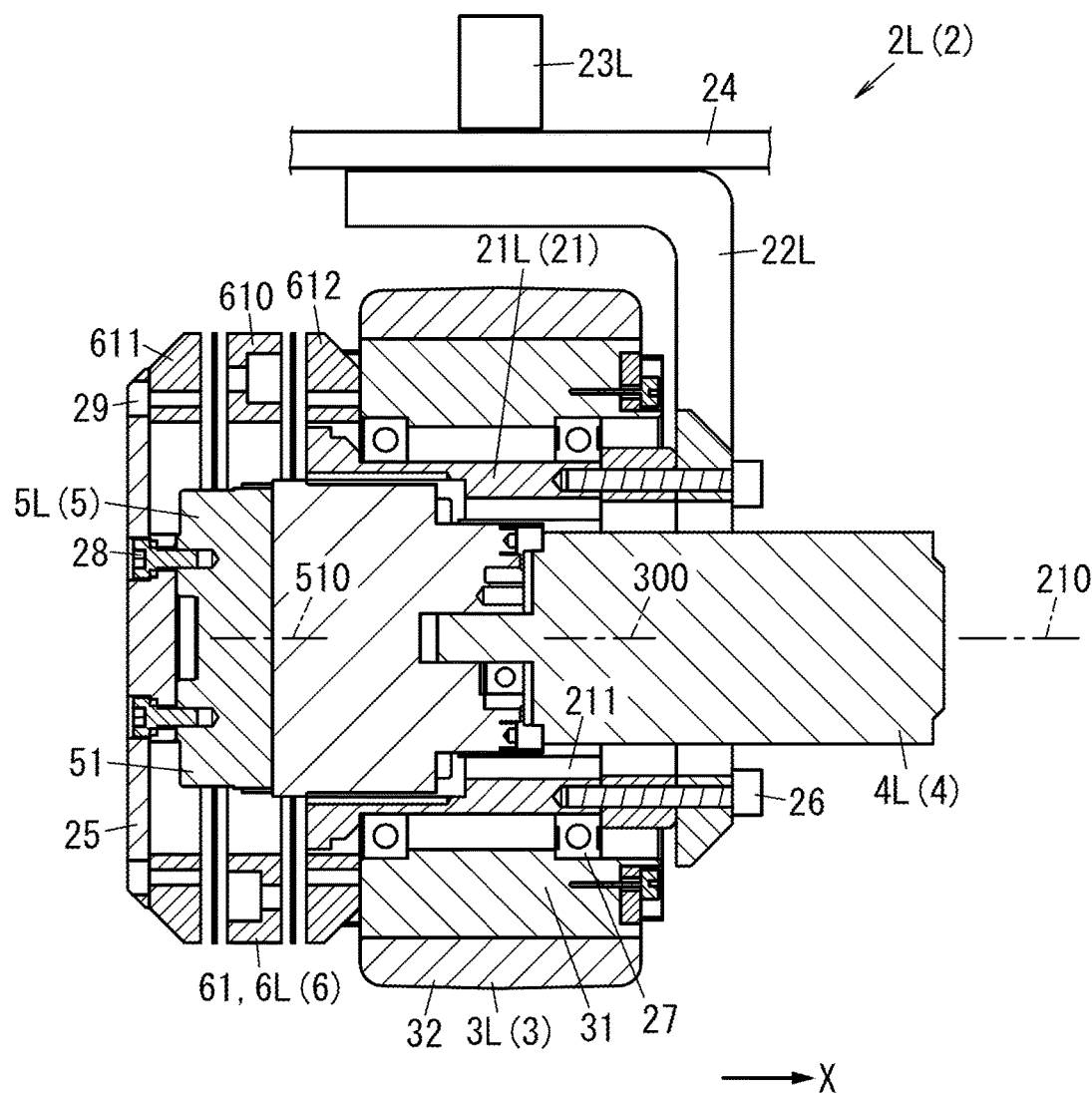
FIG. 4 is a cross-sectional view of a drive wheel unit of the mover.

The left drive wheel unit 2L controls the rotation and steering angle of the left drive wheel 3L. As shown in FIG. 4, the left drive wheel unit 2L includes: a drive motor 4L (motor 4) for turning the left drive wheel 3L in a circumferential direction; and a steering motor 23L for changing the orientation (rolling direction) of the left drive wheel 3L. The steering motor 23L is attached to a left end portion of a flat fixing plate 24, which is provided along the lower surface of the body 10 with respect to the body 10. The steering motor 23L changes the orientation of the left drive wheel 3L by rotating a bracket 22L, to which the drive motor 4L is fixed, within a plane parallel to the traveling surface B1. That is to say, the left drive wheel unit 2L and the left drive wheel 3L supported by the left drive wheel unit 2L are fixed to the body 10 via the fixing plate 24 and other members. In this case, in accordance with a control command from the controller 11, the left drive wheel unit 2L makes the steering motor 23L change the orientation of the left drive wheel 3L into an orientation instructed by the control command and also makes the drive motor 4L turn the left drive wheel 3L with a rotational torque or rotational velocity instructed by the control command.

The left drive wheel 3L includes a wheel 31 having an annular shape and made of a metal, for example, and a tread tire 32 fitted onto the wheel 31 and made of rubber, for example. The drive wheels 3 are arranged to turn around the axle 21.

The axle 21L (21) is attached to a bracket 22L. That is to say, the axle 21L is provided for the body 10. The axle 21L is fixed to the bracket 22L with a fastening member 26 such as a bolt. The axle 21L is configured as a cylindrical member having an internal space 211. The center axis 210 of the axle 21L is aligned with the X-axis in a state where the mover 1 is movable in the traveling direction (i.e., the positive Y-axis direction).

An inner ring of a bearing 27 is mounted onto the outer periphery of the axle 21L and the wheel 31 is mounted onto an outer ring of the bearing 27. This allows the left drive wheel 3L to turn around the axle 21L via the bearing 27.

The drive motor 4L is attached to the bracket 22L. Part of the drive motor 4L is located inside the internal space 211. More specifically, part of the drive motor 4L is located in the space inside the drive wheel 3 (i.e., a space falling within the width along the rotational center axis 300 of the drive wheel 3). Optionally, the motor 4 may be located in its entirety inside the internal space 211 (i.e., the space inside the drive wheel 3). Alternatively, the motor 4 may be attached to the axle 21 via a speed reducer 5.

The speed reducer 5L (5) is also attached to the axle 21L. The speed reducer 5L reduces the rotational power of the motor 4 and transmits the reduced rotational power of the motor 4. The speed reducer 5 includes an output shaft 51 aligned with the center axis 210 of the axle 21. Part of the speed reducer 5L is located in the internal space 211. More specifically, part of the speed reducer 5L is located in the space inside the drive wheel 3. Optionally, the speed reducer 5 may be located in its entirety inside the internal space 211 (i.e., the space inside the drive wheel 3). Alternatively, the speed reducer 5L may be attached to the bracket 22L.

The left drive wheel unit 2L includes a shaft coupling 6L (6) for movers 1. The shaft coupling 6L transmits the rotational power of the speed reducer 5L to the left drive wheel 3L. The shaft coupling 6L includes a cylindrical portion 61. The cylindrical portion 61 has an annular shape when viewed along the center axis 210 and houses the speed reducer 5 at least partially inside. In this embodiment, part of the speed reducer 5L is housed inside the cylindrical portion 61 and the rest of the speed reducer 5L is housed inside the internal space 211 of the axle 21L.

The cylindrical portion 61 includes an input portion 611, which forms one part, located at a first end along the center axis 210, of the cylindrical portion 61. The input portion 611 receives the rotational power from the output shaft 51. In this embodiment, the left drive wheel unit 2L further includes a coupler 25. The coupler 25 couples the output shaft 51 and the input portion 611 together. The coupler 25 is fixed to the output shaft 51 with fastening members 28 such as bolts and is also fixed to the input portion 611 with fastening members 29 such as bolts.

The cylindrical portion 61 also includes an output portion 612, which forms another part, located at a second end along the center axis 210, of the cylindrical portion 61. The output portion 612 outputs the rotational power to the drive wheel 3. The output portion 612 is fixed to the wheel 31 with fastening members (not shown) such as bolts.

The cylindrical portion 61 further includes an absorber 610, which is provided between the input portion 611 and the output portion 612. The absorber 610 absorbs deviation and an angle of deviation between a rotational center axis 510 of the output shaft 51 and a rotational center axis 300 of the drive wheel 3. As used herein, "to absorb deviation and an angle of deviation" means not only reducing the magnitude of the deviation and the angle of the deviation to allowable degrees but also accepting the deviation and the angle of deviation as they are, as long as the deviation and the angle of deviation fall within their tolerance ranges.

The shaft coupling 6 may be any of various known types of shaft couplings including a slit coupling with a spiral slit provided through the cylindrical portion 61, an Oldham's coupling, a bellows coupling, a disk coupling, and a serration coupling. That is to say, the shaft coupling 6 is not limited to any particular type. Nevertheless, as the shaft coupling 6 for movers 1, a shaft coupling 6 having little backlash and high rigidity is suitably used. Although a slit coupling is used in this embodiment, a disk coupling may also be used suitably.

The right drive wheel unit 2R controls the rotation and steering angle of the right drive wheel 3R. As shown in FIG. 2, the right drive wheel unit 2R includes: a drive motor 4R for turning the right drive wheel 3R in a circumferential direction; and a steering motor 23R for changing the orientation (rolling direction) of the right drive wheel 3R. The steering motor 23R is attached to the fixing plate 24. The steering motor 23R changes the orientation of the right drive wheel 3R by rotating a bracket 22R, to which the drive motor 4R is fixed, within a plane parallel to the traveling surface B1. That is to say, the right drive wheel unit 2R and the right drive wheel 3R supported by the right drive wheel unit 2R are fixed to the body 10 via the fixing plate 24 and other members. In this case, in accordance with a control command from the controller 11, the right drive wheel unit 2R makes the steering motor 23R change the orientation of the right drive wheel 3R into an orientation instructed by the control command and also makes the drive motor 4R turn the right drive wheel 3R with a rotational torque or rotational velocity instructed by the control command.

The right drive wheel unit 2R has a shape which is symmetrical to, but inverted in the rightward/leftward direction from, that of the left drive wheel unit 2L. The right drive wheel unit 2R has the same configuration as the left drive wheel unit 2L and includes constituent elements such as an axle 21R, a speed reducer 5R, and a shaft coupling 6R corresponding to all constituent elements of the left drive wheel unit 2L.

The controller 11 of the mover 1 controls the right drive wheel unit 2R to drive the right drive wheel 3R independently of the left drive wheel 3L and also controls the left drive wheel unit 2L to drive the left drive wheel unit 2L independently of the right drive wheel 3R. That is to say, the pair of drive wheels 3 (namely, the right drive wheel 3R and the left drive wheel 3L) may be steered independently of each other. Thus, steering the pair of drive wheels 3 independently of each other allows the mover 1 to move in any desired direction. In this embodiment, each of the pair of drive wheels 3 also serves as a steered wheel. This may reduce the number of wheels provided for the mover 1, compared to a situation where steered wheels are provided separately from the drive wheels 3.

In this embodiment, the body 10 is provided with two pairs of auxiliary wheels 15. The two pairs of auxiliary wheels 15 are driven wheels, of which the orientations change according to the traveling direction of the mover 1.

In this embodiment, the two pairs of auxiliary wheels 15 include casters, of which the axle 151 (see FIG. 1) has a variable orientation. That is to say, each of the two pairs of auxiliary wheels 15 is a caster (i.e., a so-called "free-rolling caster"), of which the axle 151 that supports the wheel rotatably is movable in 360-degree directions within a plane parallel to the traveling surface B1. Note that the casters for use as the auxiliary wheels 15 do not have to be such casters, of which the axle 151 has a variable orientation, but may also be ball casters, each of which has a sphere serving as a wheel and rotatable in any direction. Note that the auxiliary wheels 15 are optional constituent elements and may be omitted as appropriate.

Next, the sensing unit 14 will be described. As shown in FIGS. 1-3, the sensing unit 14 senses the behavior of the body 10 and the surroundings, for example, of the body 10. As used herein, the "behavior" refers to the operation and appearance, for example. Specifically, the behavior of the body 10 includes the operating state of the body 10 which may be traveling or at a stop, the distance that the body 10 has traveled and its duration, the velocity (and variation in the velocity) of the body 10, acceleration applied to the body 10, and the orientation of the body 10.

The sensing unit 14 includes, for example, sensors such as a light detection and ranging (LiDAR) sensor 141 for sensing an object present around the body 10, and a magnetic sensor 142 for sensing a guidance line provided on the traveling surface B1.

The LiDAR sensor 141 detects the presence or absence of any object around the body 10, also detects its location if there is any object around the body 10, and outputs the result of detection to the controller 11. The controller 11 controls, based on the information collected by the LiDAR sensor 141 about the object, traveling of the mover 1 to prevent the mover 1 from colliding against the object.

Note that the sensing unit 14 for sensing an object present around the body 10 does not have to be the LiDAR sensor 141. Alternatively, this type of sensor may also be a sensor for sensing an object by using at least one of a sound wave, light, or a radio wave.

The guidance line provided on the traveling surface B1 may be made of, for example, rubber including a hard magnetic material such as a permanent magnet material and is formed in the shape of a line to extend on the surface of the traveling surface B1 along the traveling route of the mover 1.

The magnetic sensor 142 detects, by magnetism, the guidance line provided on the traveling surface B1. The controller 11 controls, based on the result of detection obtained by the magnetic sensor 142, the right drive wheel unit 2R and the left drive wheel unit 2L such that the mover 1 travels along the guidance line.

Note that the guidance line does not have to be provided on the traveling surface B1 along the entire traveling route of the mover 1. Alternatively, guidance markers made of a magnetic material may be provided at main spots along the traveling route so that the mover 1 may travel by tracing the guidance markers. Furthermore, the guidance line or the guidance markers provided on the traveling surface B1 do not have to be configured to guide the mover 1 by using magnetism. Alternatively, a guidance line or guidance markers (such as two-dimensional barcodes) to be detected by an image sensor provided for the mover 1 may also be provided on the traveling surface B1. Still alternatively, the guidance line or guidance markers may also be detected by a contact type sensor provided for the mover 1.

Optionally, the sensing unit 14 may detect, based on the location information, collected by the LiDAR sensor 141, about a surrounding object and by reference to electronic map information about a predetermined area, the current location of the carrier X1 (mover 1) within the predetermined area and output the result of detection of the current location to the controller 11. Also, the sensing unit 14 may include a receiver for receiving beacon signals transmitted as radio waves from a plurality of transmitters, detect the current location of the carrier X1 based on the beacon signals transmitted from the plurality of transmitters, and output the result of detection of the current location to the controller 11. In this case, the plurality of transmitters are arranged at multiple sites within the predetermined area in which the carrier X1 moves. The sensing unit 14 estimates, based on the locations of the plurality of transmitters and the received radio wave strengths of the beacon signals received at the receiver, the current location of the mover 1. Alternatively, the sensing unit 14 may also detect the current location of the mover 1 by using a positioning system such as the global positioning system (GPS).

The controller 11 includes a microcomputer including, for example, one or more processors and a memory. In other words, the controller 11 is implemented as a computer system including one or more processors and a memory. The controller 11 outputs, in accordance with a carry instruction from the high-order system 100 and based on a result of sensing obtained by the sensing unit 14, for example, a control command to each drive wheel unit 2 and controls the orientation and rotation of each drive wheel 3, thereby allowing the mover 1 to move in any desired direction at a desired velocity.

The power supply 12 may be a secondary battery, for example. The power supply 12 supplies power either directly or indirectly to the left drive wheel unit 2L and the right drive wheel unit 2R, the controller 11, the communications unit 13, the sensing unit 14, and other components. Optionally, the carrier X1 may be supplied with power from an external power supply. In that case, the carrier X1 does not have to include the power supply 12.

The communications unit 13 is configured to be ready to communicate with the high-order system 100. In this embodiment, the communications unit 13 communicates, by wireless communication using radio waves as a propagation medium, with any of a plurality of relays R1 installed within the predetermined area in which the carrier X1 moves. Thus, the communications unit 13 and the high-order system 100 communicate with each other indirectly via at least the network NT1 and the relay R1.

Each relay R1 is a device (access point) that relays communication between the communications unit 13 and the high-order system 100. The relay R1 communicates with the high-order system 100 via the network NT1. In this embodiment, wireless communication compliant with a standard such the Wi-Fi®, Bluetooth®, ZigBee®, or a low power radio standard requiring no licenses (Specified Low Power Radio) may be adopted as the communication between the relay R1 and the communications unit 13. Also, the network NT1 does not have to be the Internet but may also be a local area network either within the predetermined area in which the carrier X1 moves or within an operating company in the predetermined area.

(2.3) Parts Mounting System

The carrier X1 according to this embodiment may be used in a parts mounting system W1 including at least one parts mounter 80 for mounting parts onto a board as shown in FIG. 3.

The parts mounter 80 includes a feeder cart 81 (see FIG. 3) for feeding the parts and a mounter body 82 including a mount head for mounting the parts onto the board.

The feeder cart 81 is used to feed parts onto the mounter body 82 of the parts mounter 80 installed in a factory. As used herein, the "parts mounter" refers to a machine for mounting parts onto a target such as a board. The mounter body 82 includes a mount head for mounting the parts onto the board. In this embodiment, the carrier X1 carries the feeder cart 81 as the burden A1 to the place where the mounter body 82 of the parts mounter 80 is installed. This enables establishing a parts mounting system W1. In other words, the parts mounting system W1 is a system including at least one parts mounter 80 for mounting parts onto the board. The feeder cart 81 is carried by the carrier X1 to the mounter body 82. In this embodiment, the carrier X1 carries, in accordance with an instruction from the high-order system 100, for example, the feeder cart 81, which is put at a certain location within the predetermined area, to the location where the feeder cart 81 is supposed to be connected to the mounter body 82. When the carrier X1 carries the feeder cart 81 to inside a recess 821 provided on a side surface of the mounter body 82, a second connector of the feeder cart 81 is connected to a first connector provided for the mounter body 82, thus making the mounter body 82 and the feeder cart 81 connected to each other. With the mounter body 82 and the feeder cart 81 thus connected to each other, the parts are ready to be fed from the feeder cart 81 onto the mounter body 82.

In this case, the carrier X1 is suitably coupled to a portion, opposite from a parts feeding portion (through which the parts are fed onto the mounter body 82), of the feeder cart 81. In that case, when the feeder cart 81 is carried to the location where the mounter body 82 of the parts mounter 80 is installed, the parts feeding portion of the feeder cart 81 faces toward the mounter body 82. This eliminates the need to change the orientation of the feeder cart 81 such that the parts feeding portion faces toward the mounter body 82 when the feeder cart 81 is carried to the location where the mounter body 82 of the parts mounter 80 is installed.

(2.4) Operation

Next, an exemplary operation of the carrier X1 that uses the mover 1 according to this embodiment will be described with reference to the accompanying drawings.

The carrier X1 according to this embodiment performs the job of carrying the burden A1 by moving along with the burden A1 coupled thereto via the burden coupling portion 181. In this case, the burden coupling portion 181 couples the burden A1 to the carrier X1 with a degree of freedom left in the upward/downward direction.

The mover 1 includes the shaft coupling 6 including the cylindrical portion 61 described above, and therefore, may absorb deviation and the angle of deviation between the rotational center axis 510 of the output shaft 51 and the rotational center axis 300 of the drive wheel 3. In addition, housing a part of the speed reducer 5 inside the cylindrical portion 61 may reduce the chances of the speed reducer 5 and the drive wheel 3 having excessive lengths along the center axis 210, thus contributing to reducing the size of the drive wheel unit 2 and eventually the overall size of the mover 1.

(3) Second Embodiment

Figure 5:
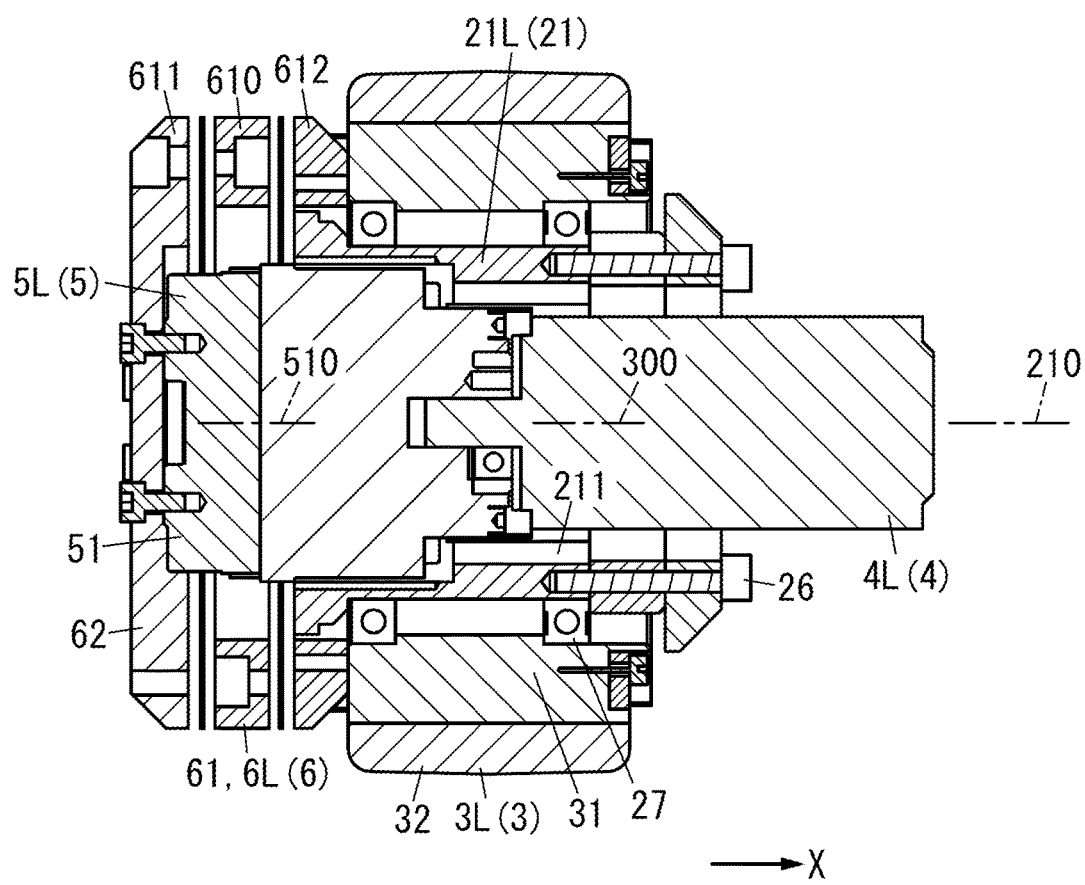
FIG. 5 is a cross-sectional view of a drive wheel unit of a mover according to a second embodiment of the present disclosure.
Figure 6A:
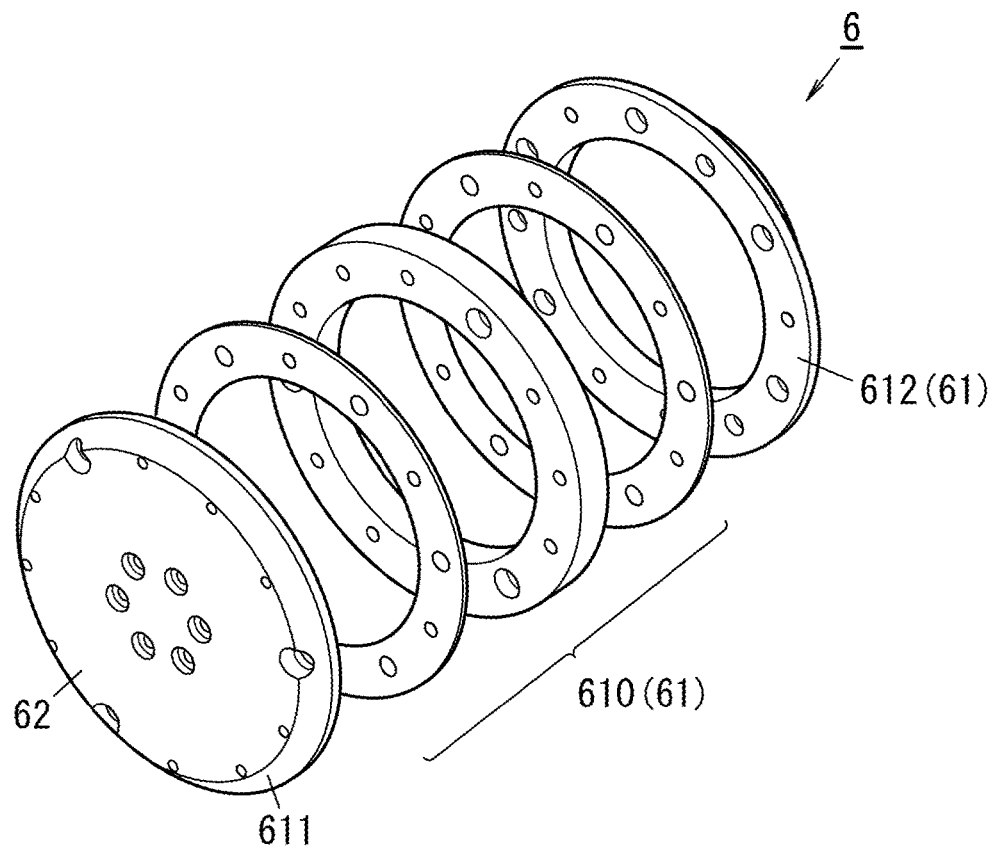
FIG. 6A is an exploded perspective view of a shaft coupling for use in the mover.
Figure 6B:
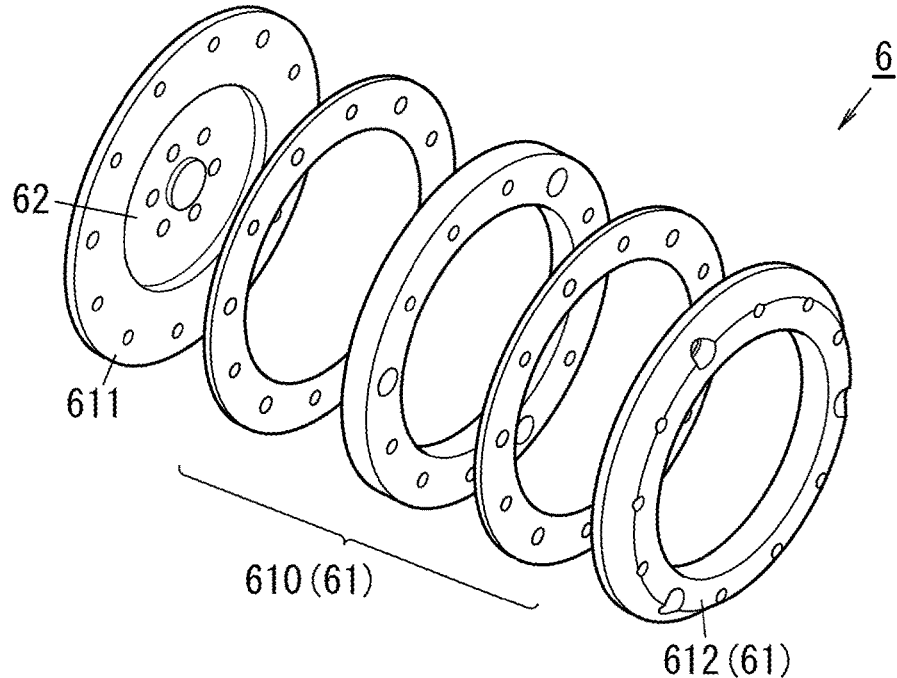
FIG. 6B is an exploded perspective view of the shaft coupling as viewed from a different angle from FIG. 6A.

Next, a mover 1 according to a second embodiment will be described with reference to FIGS. 5 and 6. The mover 1 according to the second embodiment is mostly the same as the mover 1 according to the first embodiment, and their common features will not be described all over again to avoid redundancy.

In the first embodiment described above, the mover 1 includes the coupler 25 for coupling the output shaft 51 to the input portion 611 as a member separately provided from the shaft coupling 6. According to the second embodiment, on the other hand, no coupler 25 is provided but the shaft coupling 6 includes a coupling portion 62 as an integral part thereof. The coupling portion 62 extends integrally from the input portion 611 along the center axis 210 and is coupled to the output shaft 51. This reduces the number of members that form the mover 1.

(4) Third Embodiment

Figure 7:
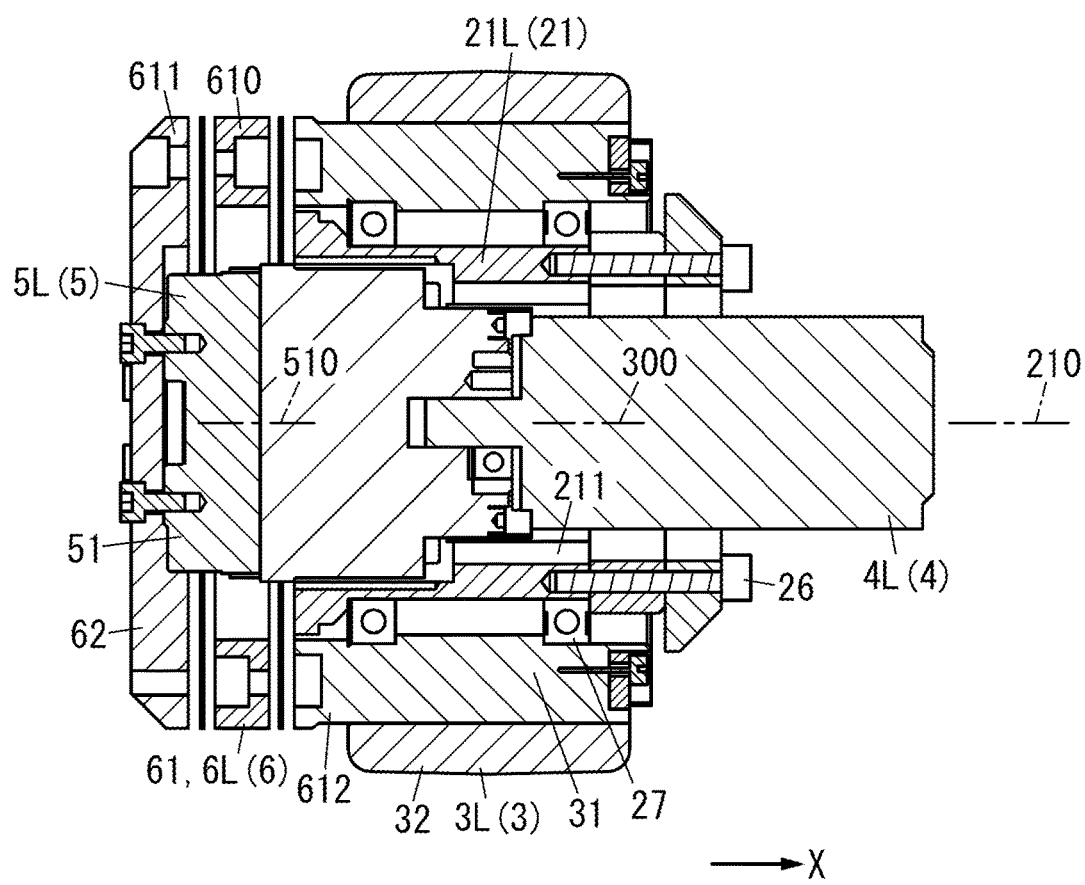
FIG. 7 is a cross-sectional view of a drive wheel unit of a mover according to a third embodiment of the present disclosure.

Next, a mover 1 according to a third embodiment will be described with reference to FIG. 7. The mover 1 according to the third embodiment is mostly the same as the mover 1 according to the second embodiment, and their common features will not be described all over again to avoid redundancy.

In the second embodiment described above, the mover 1 includes the output portion 612 of the shaft coupling 6 and the wheel 31 of the drive wheel 3 as two separate members. According to the third embodiment, on the other hand, the mover 1 includes the output portion 612 of the shaft coupling 6 and the wheel 31 of the drive wheel 3 as an integral member in which the cylindrical portion 61 and the wheel 31 are integrated together. This reduces the number of members that form the mover 1.

(5) Fourth Embodiment

Figure 8:
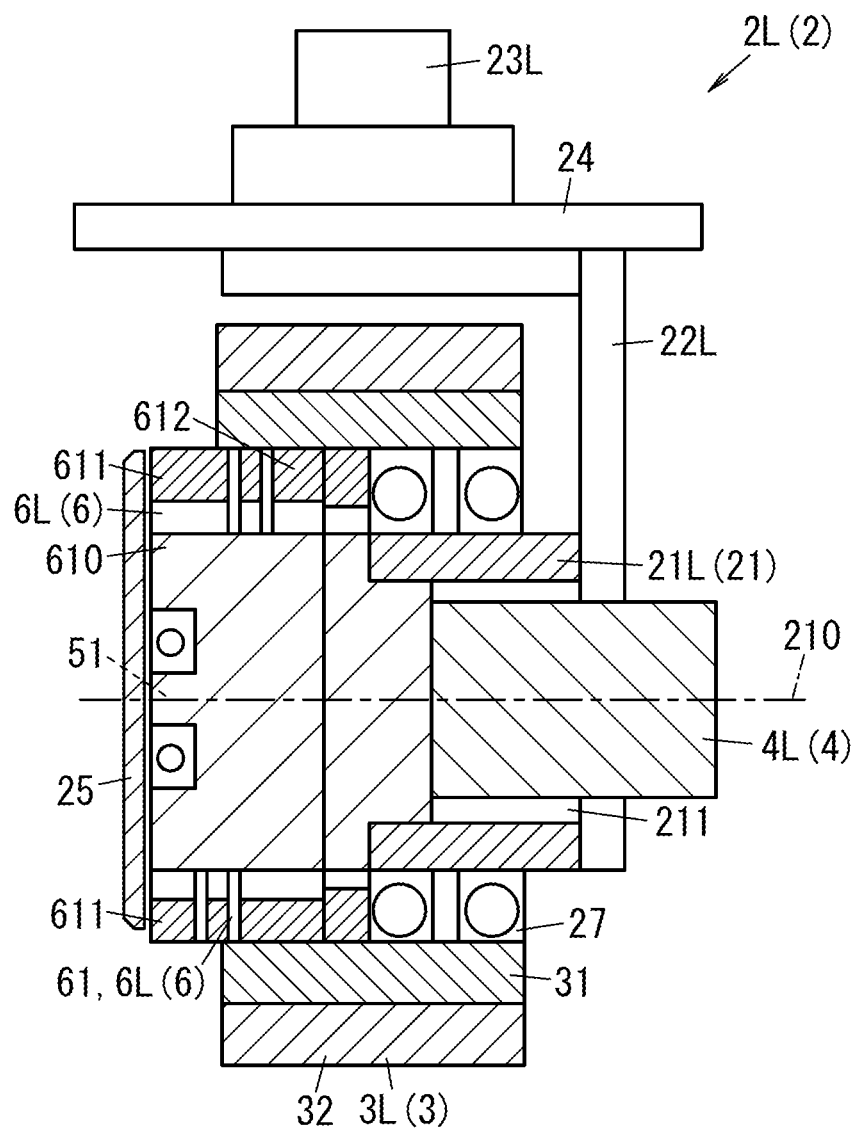
FIG. 8 is a cross-sectional view of a drive wheel unit of a mover according to a fourth embodiment of the present disclosure.

Next, a mover 1 according to a fourth embodiment will be described with reference to FIG. 8. The mover 1 according to the fourth embodiment is mostly the same as the mover 1 according to the first embodiment, and their common features will not be described all over again to avoid redundancy.

In the first embodiment, the shaft coupling 6 is not arranged in the internal space 211 of the axle 21. According to the fourth embodiment, on the other hand, part of the shaft coupling 6 is located in the internal space 211 of the axle 21. This reduces the part, located outside of the axle 21, of the shaft coupling 6, thus improving the appearance of the mover 1 and reducing the chances of an object colliding against the part, exposed outside of the axle 21, of the shaft coupling 6.

(6) Fifth Embodiment

Figure 9:
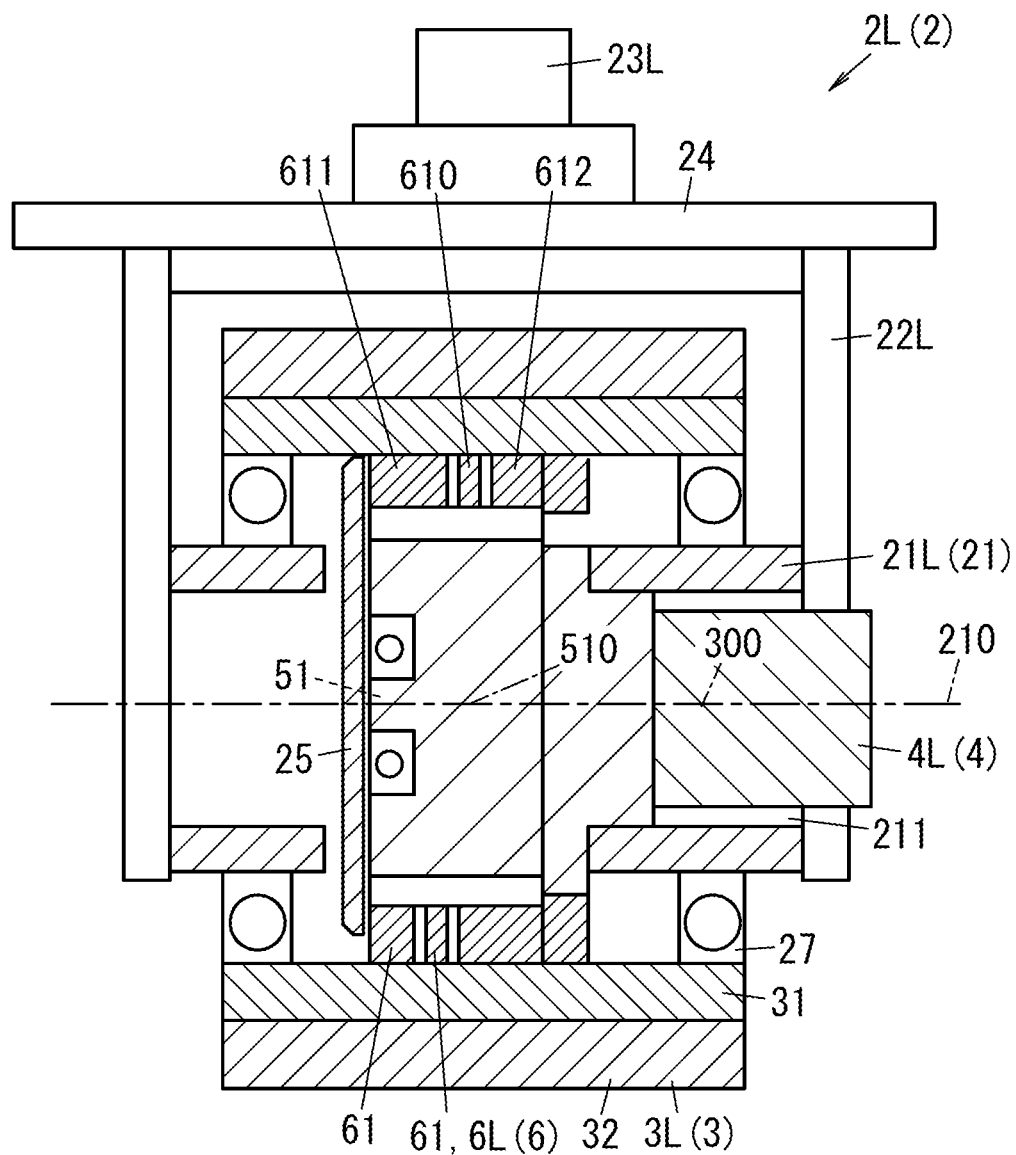
FIG. 9 is a cross-sectional view of a drive wheel unit of a mover according to a fifth embodiment of the present disclosure.

Next, a mover 1 according to a fifth embodiment will be described with reference to FIG. 9. The mover 1 according to the fifth embodiment is mostly the same as the mover 1 according to the first embodiment, and their common features will not be described all over again to avoid redundancy.

In the first embodiment described above, the shaft coupling 6 is not arranged in the internal space 211 of the axle 21. According to the fifth embodiment, on the other hand, the shaft coupling 6 is located in its entirety in the internal space 211 of the axle 21. This eliminates the part, located outside of the axle 21, of the shaft coupling 6, thus improving the appearance of the mover 1 and preventing an object from colliding against the shaft coupling 6 exposed outside of the axle 21.

(7) Variations

Next, variations of the embodiments described above will be enumerated one after another. Optionally, the variations to be described below may be adopted in combination as appropriate.

In each of the embodiments described above, the mover 1 includes the speed reducer 5. However, the mover 1 may include no speed reducer 5. In that case, the motor 4 includes an output shaft aligned with the center axis 210 of the axle 21 and the rotational power of the output shaft is supplied to the input portion 611 of the shaft coupling 6. The motor 4 is housed at least partially inside the cylindrical portion 61 of the shaft coupling 6. The absorber 610 of the shaft coupling 6 may absorb deviation and an angle of deviation between the rotational center axis of the motor 4 and the rotational center axis 300 of the drive wheel 3.

The mover 1 (carrier X1) according to the present disclosure includes a computer system. The computer system includes, as principal hardware components, a processor and a memory. The functions of the mover 1 (carrier X1) according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Recapitulation

As can be seen from the foregoing description, a mover (1) according to a first aspect includes a body (10), an axle (21), a drive wheel (3), a motor (4), a speed reducer (5), and a shaft coupling (6). The axle (21) is provided for the body (10). The drive wheel (3) is arranged rotatably around the axle (21). The speed reducer (5) is attached to the axle (21) to reduce rotational power of the motor (4) and transmit reduced rotational power of the motor (4). The speed reducer (5) includes an output shaft (51) aligned with a center axis (210) of the axle (21). The shaft coupling (6) transmits the rotational power of the speed reducer (5) to the drive wheel (3). The shaft coupling (6) includes a cylindrical portion (61). The cylindrical portion (61) has an annular shape when viewed along the center axis (210) and houses the speed reducer (5) at least partially inside. The cylindrical portion (61) includes an input portion (611). The input portion (611) forms one part, located at a first end along the center axis (210), of the cylindrical portion (61). The input portion (611) receives the rotational power from the output shaft (51). The cylindrical portion (61) also includes an output portion (612). The output portion (612) forms another part, located at a second end along the center axis (210), of the cylindrical portion (61). The output portion (612) outputs the rotational power to the drive wheel (3). The cylindrical portion (61) further includes an absorber (610) provided between the input portion (611) and the output portion (612). The absorber (610) absorbs deviation and an angle of deviation between a rotational center axis (510) of the output shaft (51) and a rotational center axis (300) of the drive wheel (3).

According to the first aspect, the absorber (610) may absorb deviation and an angle of deviation between the rotational center axis (510) and the rotational center axis (300). In addition, housing a part of the speed reducer (5) inside the cylindrical portion (61) may reduce the respective lengths of the speed reducer (5) and the drive wheel (3) as measured along the center axis (210).

A mover (1) according to a second aspect includes a body (10), an axle (21), a drive wheel (3), a motor (4), and a shaft coupling (6). The axle (21) is provided for the body (10). The drive wheel (3) is arranged rotatably around the axle (21). The motor (4) is attached to the axle (21). The motor (4) includes an output shaft aligned with a center axis (210) of the axle (21). The shaft coupling (6) transmits rotational power of the motor (4) to the drive wheel (3). The shaft coupling (6) includes a cylindrical portion (61). The cylindrical portion (61) has an annular shape when viewed along the center axis (210) and houses the motor (4) at least partially inside. The cylindrical portion (61) includes an input portion (611). The input portion (611) forms one part, located at a first end along the center axis (210), of the cylindrical portion (61). The input portion (611) receives the rotational power from the output shaft. The cylindrical portion (61) also includes an output portion (612). The output portion (612) forms another part, located at a second end along the center axis (210), of the cylindrical portion (61). The output portion (612) outputs the rotational power to the drive wheel (3). The cylindrical portion (61) further includes an absorber (610) provided between the input portion (611) and the output portion (612). The absorber (610) absorbs deviation and an angle of deviation between a rotational center axis of the output shaft and a rotational center axis (300) of the drive wheel (3).

According to the second aspect, the absorber (610) may absorb deviation and an angle of deviation between the rotational center axis and the rotational center axis (300). In addition, housing a part of the motor (4) inside the cylindrical portion (61) may reduce the respective lengths of the motor (4) and the drive wheel (3) as measured along the center axis (210).

A third aspect may be implemented in conjunction with the first or second aspect. In the third aspect, the absorber (610) may further absorb an end play of the output shaft and the drive wheel (3).

According to the third aspect, even the end play of the output shaft and the drive wheel (3) may also be absorbed.

A fourth aspect may be implemented in conjunction with any one of the first to third aspects. In the fourth aspect, the mover (1) further includes a coupler (25). The coupler (25) couples the output shaft (51) and the input portion (611) together.

According to the fourth aspect, the output shaft (51) and the cylindrical portion (61), which are separated from each other in a direction perpendicular to the center axis (210), may be coupled together via the coupler (25).

A fifth aspect may be implemented in conjunction with any one of the first to third aspects. In the fifth aspect, the shaft coupling (6) further includes a coupling portion (62). The coupling portion (62) extends integrally from the input portion (611) along the center axis (210) and is coupled to the output shaft (51).

According to the fifth aspect, the output shaft (51) and the cylindrical portion (61), which are separated from each other in a direction perpendicular to the center axis (210), may be coupled together via the coupling portion (62) which is formed integrally with the cylindrical portion (61). In addition, according to the fifth aspect, the number of parts required may also be reduced.

A sixth aspect may be implemented in conjunction with any one of the first to fifth aspects. In the sixth aspect, the axle (21) has an internal space (211). The speed reducer (5) is located in the internal space (211) either partially or entirely.

The sixth aspect may further reduce the chances of the speed reducer (5) and the drive wheel (3) having excessive lengths along the center axis (210).

A seventh aspect may be implemented in conjunction with any one of the first to sixth aspects. In the seventh aspect, the axle (21) has an internal space (211). The motor (4) is located in the internal space (211) either partially or entirely.

The seventh aspect may further reduce the chances of the speed reducer (5), the drive wheel (3), and the motor (4) having excessive lengths along the center axis (210).

An eighth aspect is a carrier (X1) that uses the mover (1) according to any one of the first to seventh aspects. The body (10) includes a holder (18) to hold a burden (A1) thereon.

The eighth aspect provides a carrier (X1), of which the speed reducer (5) and drive wheel (3) have reduced lengths along the center axis (210).

A ninth aspect may be implemented in conjunction with the eighth aspect. In the ninth aspect, the holder (18) includes a burden coupling portion (181) to be coupled to the burden (A1) to hold the burden (A1) thereon.

According to the ninth aspect, the burden coupling portion (181) allows the burden (A1) to be coupled and held.

A parts mounting system (W1) according to a tenth aspect includes at least one parts mounter (80) to mount parts on a board. The parts mounter (80) includes: a feeder cart (81) to feed the parts; and a mounter body (82) including a mount head to mount the parts onto the board. The feeder cart (81) is the burden (A1) to be carried by the carrier (X1) according to the eighth or ninth aspect to the mounter body (82).

The tenth aspect provides a parts mounting system (W1), of which the speed reducer (5) and drive wheel (3) have reduced lengths along the center axis (210).

A shaft coupling (6) for movers (1) according to an eleventh aspect includes a cylindrical portion (61). The cylindrical portion (61) has an annular shape when viewed along an axis and houses a speed reducer (5) and/or a motor (4) at least partially inside. The cylindrical portion (61) includes an input portion (611). The input portion (611) forms one part, located at a first end along the axis, of the cylindrical portion (61). The input portion (611) receives rotational power from an output shaft (51) of the speed reducer (5) or an output shaft of the motor (4). The cylindrical portion (61) also includes an output portion (612). The output portion (612) forms another part, located at a second end along the axis, of the cylindrical portion (61). The output portion (612) outputs the rotational power to a drive wheel (3). The cylindrical portion (61) further includes an absorber (610) provided between the input portion (611) and the output portion (612). The absorber (610) absorbs deviation and an angle of deviation between a center axis of the input portion (611) and a center axis of the output portion (612).

According to the eleventh aspect, housing a part of the speed reducer (5) or the motor (4) inside the cylindrical portion (61) may reduce the respective lengths, measured along the center axis (210), of the speed reducer (5) or the motor (4) coupled to the input portion (611) and the drive wheel (3) coupled to the output portion (612).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A mover comprising:
a body;
an axle provided for the body;
a drive wheel arranged rotatably around the axle;
a motor;
a speed reducer attached to the axle and configured to reduce rotational power of the motor and transmit reduced rotational power of the motor; and
a shaft coupling configured to transmit the rotational power of the speed reducer to the drive wheel,
the speed reducer including an output shaft aligned with a center axis of the axle,
the shaft coupling including a cylindrical portion, the cylindrical portion having an annular shape when viewed along the center axis and housing the speed reducer at least partially inside,
the cylindrical portion including:
an input portion forming one part, located at a first end along the center axis, of the cylindrical portion, the input portion being configured to receive the rotational power from the output shaft;
an output portion forming another part, located at a second end along the center axis, of the cylindrical portion, the output portion being configured to output the rotational power to the drive wheel; and
an absorber provided between the input portion and the output portion, the absorber being configured to absorb deviation and an angle of deviation between a rotational center axis of the output shaft and a rotational center axis of the drive wheel.

2. A mover comprising:
a body;
an axle provided for the body;
a drive wheel arranged rotatably around the axle;
a motor attached to the axle; and
a shaft coupling configured to transmit rotational power of the motor to the drive wheel, the motor including an output shaft aligned with a center axis of the axle, the shaft coupling including a cylindrical portion, the cylindrical portion having an annular shape when viewed along the center axis and housing the motor at least partially inside, the cylindrical portion including:

an input portion forming one part, located at a first end along the center axis, of the cylindrical portion, the input portion being configured to receive the rotational power from the output shaft;

an output portion forming another part, located at a second end along the center axis, of the cylindrical portion, the output portion being configured to output the rotational power to the drive wheel; and an absorber provided between the input portion and the output portion, the absorber being configured to absorb deviation and an angle of deviation between a rotational center axis of the output shaft and a rotational center axis of the drive wheel.

3. The mover of claim 1, wherein
the absorber is configured to further absorb an end play of the output shaft and the drive wheel.

4. The mover of claim 2, wherein
the absorber is configured to further absorb an end play of the output shaft and the drive wheel.

5. The mover of claim 1, further comprising a coupler,
the coupler being configured to couple the output shaft and the input portion together.

6. The mover of claim 2, further comprising a coupler,
the coupler being configured to couple the output shaft and the input portion together.

7. The mover of claim 1, wherein
the shaft coupling further includes a coupling portion,
the coupling portion extending integrally from the input portion along the center axis and coupled to the output shaft.

8. The mover of claim 2, wherein
the shaft coupling further includes a coupling portion,
the coupling portion extending integrally from the input portion along the center axis and coupled to the output shaft.

9. The mover of claim 1, wherein
the axle has an internal space, and
the speed reducer is located in the internal space either partially or entirely.

10. The mover of claim 1, wherein
the axle has an internal space, and
the motor is located in the internal space either partially or entirely.

11. The mover of claim 2, wherein
the axle has an internal space, and
the motor is located in the internal space either partially or entirely.

12. A carrier that uses the mover of claim 1,
the body including a holder configured to hold a burden thereon.

13. A carrier that uses the mover of claim 2,
the body including a holder configured to hold a burden thereon.

14. The carrier of claim 12, wherein
the holder includes a burden coupling portion configured to be coupled to the burden to hold the burden thereon.

15. The carrier of claim 13, wherein
the holder includes a burden coupling portion configured to be coupled to the burden to hold the burden thereon.

16. A parts mounting system comprising:
at least one parts mounter configured to mount parts on a board,
the parts mounter including:
a feeder cart configured to feed the parts; and
a mounter body including a mount head configured to mount the parts onto the board,
the feeder cart being the burden to be carried by the carrier of claim 12 to the mounter body.

17. A parts mounting system comprising:
at least one parts mounter configured to mount parts on a board,
the parts mounter including:
a feeder cart configured to feed the parts; and
a mounter body including a mount head configured to mount the parts onto the board,
the feeder cart being the burden to be carried by the carrier of claim 13 to the mounter body.

18. A shaft coupling for movers, the shaft coupling including a cylindrical portion, the cylindrical portion having an annular shape when viewed along an axis and configured to house a speed reducer and/or a motor at least partially inside, the cylindrical portion including:

an input portion forming one part, located at a first end along the axis, of the cylindrical portion, the input portion being configured to receive rotational power from an output shaft of the speed reducer or an output shaft of the motor;

an output portion forming another part, located at a second end along the axis, of the cylindrical portion, the output portion being configured to output the rotational power to a drive wheel; and an absorber provided between the input portion and the output portion, the absorber being configured to absorb deviation and an angle of deviation between a center axis of the input portion and a center axis of the output portion.

* * * * *